United States Patent [19]

Blankenburg

[11] Patent Number: 5,728,325
[45] Date of Patent: Mar. 17, 1998

[54] GAS ASSIST INJECTION MOLDING APPARATUS AND METHOD WITH MULTIPLE TEMPERATURE GAS SUPPLY

[76] Inventor: Karl Blankenburg, 32131 Claeys Dr., Warren, Mich. 48093

[21] Appl. No.: 600,119

[22] Filed: Feb. 12, 1996

Related U.S. Application Data

[63] Continuation of Ser. No. 223,445, Apr. 5, 1994, abandoned.

[51] Int. Cl.$^6$ .................. B29C 45/72; B29C 45/76
[52] U.S. Cl. .................. 264/28; 264/40.1; 264/40.3; 264/572; 425/130; 425/145; 425/146; 425/155; 425/160
[58] Field of Search .................. 264/40.3, 40.1, 264/28, 45.1, 572; 425/130, 145, 146, 156, 159, 160, 155

[56] References Cited

U.S. PATENT DOCUMENTS

| | | |
|---|---|---|
| 4,101,617 | 7/1978 | Friederich . |
| 4,115,491 | 9/1978 | Hanning .................. 264/45.1 |
| 4,740,150 | 4/1988 | Sayer . |
| 4,750,409 | 6/1988 | Hendry . |
| 4,781,554 | 11/1988 | Hendry . |
| 4,824,732 | 4/1989 | Hendry et al. . |
| 4,830,812 | 5/1989 | Kauer . |
| 4,855,094 | 8/1989 | Hendry . |
| 4,913,644 | 4/1990 | Kauer . |
| 4,923,666 | 5/1990 | Yamazaki et al. . |
| 4,923,667 | 5/1990 | Sayer . |
| 4,935,191 | 6/1990 | Baxi . |
| 4,942,006 | 7/1990 | Loren . |
| 4,943,407 | 7/1990 | Hendry . |
| 4,944,910 | 7/1990 | Hendry . |
| 4,948,547 | 8/1990 | Hendry . |
| 5,015,166 | 5/1991 | Baxi . |
| 5,028,377 | 7/1991 | Hendry . |
| 5,032,345 | 7/1991 | Hendry . |
| 5,039,463 | 8/1991 | Loren . |
| 5,047,183 | 9/1991 | Eckardt et al. . |
| 5,049,056 | 9/1991 | Baxi et al. . |
| 5,056,997 | 10/1991 | Hayashi et al. . |
| 5,066,214 | 11/1991 | Baxi et al. . |
| 5,069,858 | 12/1991 | Hendry . |
| 5,069,859 | 12/1991 | Loren . |
| 5,080,570 | 1/1992 | Baxi et al. . |
| 5,093,053 | 3/1992 | Eckardt et al. . |
| 5,096,655 | 3/1992 | Baxi et al. . |
| 5,098,637 | 3/1992 | Hendry . |
| 5,110,533 | 5/1992 | Hendry . |
| 5,112,563 | 5/1992 | Baxi . |
| 5,114,660 | 5/1992 | Hendry . |
| 5,118,455 | 6/1992 | Loren .................. 264/572 |
| 5,127,814 | 7/1992 | Johnson et al. . |
| 5,131,226 | 7/1992 | Hendry . |
| 5,135,703 | 8/1992 | Hunerberg et al. . |
| 5,137,680 | 8/1992 | Hendry . |
| 5,139,714 | 8/1992 | Hettinga . |
| 5,141,682 | 8/1992 | Steinbichler et al. . |
| 5,151,278 | 9/1992 | Baxi et al. . |
| 5,162,122 | 11/1992 | Loren . |
| 5,198,240 | 3/1993 | Baxi .................. 264/572 |
| 5,204,050 | 4/1993 | Loren .................. 264/572 |
| 5,208,046 | 5/1993 | Shah et al. . |
| 5,295,800 | 3/1994 | Nelson et al. .................. 264/572 |
| 5,354,523 | 10/1994 | Shah .................. 264/572 |

*Primary Examiner*—Catherine Timm
*Attorney, Agent, or Firm*—Young & Basile, PC

[57] ABSTRACT

A supply of pressurized gas is separated into a first quantity of pressurized gas at a first temperature and a second quantity of pressurized gas at a second lower temperature. The first and second quantities of gas are injected into molten plastic in an injection mold in a predetermined sequence to form a hollow molded plastic article. A controller independently controls the pressure and time of delivery of the first and second quantities of pressurized gas supplied to the mold. A third quantity of extremely lower temperature gas may also be supplied to the mold in a timed sequence with the first and second quantities of gas. A variable pressure regulator receives stored pressure signals from the controller and establishes the pressures of the first, second and the optional third quantities of gas independent of each other.

29 Claims, 8 Drawing Sheets

GAS ASSIST INJECTION MOLDING APPARATUS AND METHOD WITH MULTIPLE TEMPERATURE GAS SUPPLY

This application is a continuation of application Ser. No. 08/223,445, filed on Apr. 5, 1994, now abandoned.

BACKGROUND OF THE INVENTION

1. Field of the Invention

The present invention relates, in general, to plastic injection molding methods and apparatus and, specifically, to gas assisted injection molding methods and apparatus.

2. Description of the Art

Molded plastic articles are typically formed by introducing molten plastic into a mold having a cavity formed to the shape of a desired article. The plastic material is injected in a sufficient quantity to completely fill all of the interior spaces within the mold cavity.

In forming hollow plastic articles, pressurized gas is injected into the cavity along with or just after the injection of molten plastic into the cavity. The pressurized gas forces the molten plastic against the walls of the mold cavity where it cools to a solid state while forming a hollow interior within the molded article.

The gas is injected at a constant temperature and typically at a constant pressure until the completion of the molding cycle. In order to prevent blow through of gas through the plastic, it has been proposed, as described in U.S. Pat. No. 5,047,183, to inject gas at a first low pressure, then after the injection of the molten plastic has been completed, to raise the pressure of the gas to a higher level until the plastic substantially solidifies. The gas pressure is then lowered to an intermediate pressure level, near ambient, until the article completely solidifies. However, the three different pressure levels are set by separate pressure regulators to the required pressures and can only be changed manually to different pressures.

Furthermore, the constant temperature of the gas, typically at ambient temperature, causes immediate cooling of the hot molten plastic when the ambient temperature gas contacts the plastic which occurs before the plastic is forced completely against the walls of the mold cavity. This leads to a less than desired quality for the molded article or product.

Thus, it would be desirable to provide a gas assisted injection molding method and apparatus which is capable of injecting gas at different temperatures, one being close to the temperature of the molten plastic, to prevent cooling of the plastic upon initial contact between the gas and the molten plastic. It would also be desirable to provide a gas assisted injection molding method and apparatus which can inject gas at a temperature substantially less than ambient temperature to aid in solidifying the molten plastic. It would also be desirable to provide a gas assisted injection molding method and apparatus which is capable of providing gas at different selectible pressures throughout the various stages of the injection molding cycle. It would also be desirable to provide a gas assisted injection molding method and apparatus which is capable of variably adjusting the gas pressure at each point and continuously throughout the injection molding cycle.

SUMMARY OF THE INVENTION

The present invention is an apparatus and method for injection molding a hollow plastic article. The apparatus includes:

means for injecting molten plastic into an injection mold;

means for supplying a first quantity of gas at a first temperature;

means for supplying a second quantity of gas at a second lower temperature relative to the temperature of the first quantity of gas;

means for delivering the first and second quantities of gas under pressure into the injection mold along with or after the molten plastic to force the molten plastic against the mold wall to form a hollow interior within the plastic as the molten plastic solidifies; and control means for controlling the delivery of the first and second quantities of gas through the delivery means in a predetermined, selectible sequence into the injection mold.

In a preferred embodiment, the control means selectively varies, according to a stored, control program, at least one and preferably all of the pressure and delivery time of the first and second quantities of gas to the mold cavity.

In another embodiment, means are provided for supplying a third quantity of extremely low temperature gas, the temperature of the third quantity of gas being substantially lower than the first and second temperatures. The control means controls the delivering means to deliver the third quantity of extremely low temperature gas to the mold in a timed sequence with at least one of the first and second quantities of gas.

A variable pressure regulating valve means is disposed in fluid flow communication with the means for receiving the first quantity of gas and the means for supplying the second quantity of gas and is responsive to control signals from the control means for selectively setting the pressure for the delivery of the first and second quantities of gas to the mold. The variable pressure regulating valve means is capable of setting different pressures for each of the first and second quantities of gas.

The method of the present invention includes the steps of:

injecting molten plastic into an injection mold;

supplying a first quantity of the pressurized gas at a first temperature;

supplying a second quantity of the pressurized gas at a second temperature, the second temperature being lower relative to the temperature of the first quantity of gas;

delivering the first and second quantities of gas in a selectible sequence into the molten plastic in the injection mold to force the molten plastic against the mold to form a hollow interior within the plastic as the molten plastic solidifies to a solid state.

The method also includes the steps of supplying an initial large quantity of pressurized gas, storing the second quantity of gas at the second temperature from the large quantity of gas and heating a portion of the large quantity of gas to form the first quantity of gas at the first temperature.

The method also includes the steps of supplying a third quantity of gas at an extremely low temperature relative to the first and second temperatures of the first and second quantities of gas and the further step of supplying the third quantity of gas to the mold in a timed sequence with the first and second quantities of gas.

The apparatus and method of the present invention uniquely provides and uses relative cold and hot temperature gas supplies to form a hollow plastic molded article. The initial supply of hot or high temperature gas to the mold prevents any initial chilling or solidification of the molten plastic when it contacts the gas as compared to prior art gas assist injection molding apparatus and methods wherein low or ambient temperature gas is used and causes solidification of the molten plastic upon immediate contact therewith. After the hot gas has been vented, the quantity of cold or low temperature gas is delivered to the mold to expedite the solidification of the molten plastic to a solid form. The use of extremely low temperature gas further expedites the solidification of the molten plastic. The control means of the present invention also provides separate and variable control over various gas supply parameters, including pressure and delivery time, to enable the various quantities of gas to be supplied at any desired pressure and length of delivery time and at any selectible increasing or decreasing pressure magnitude with respect to time.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
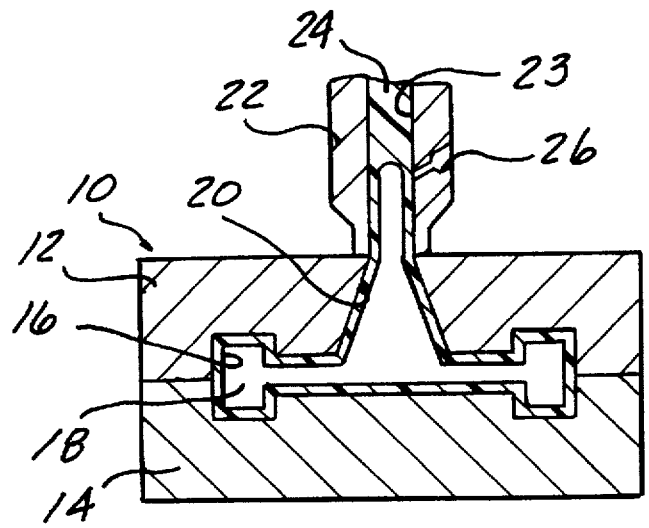
FIG. 1 is a cross sectional view of a conventional gas assisted injection mold.

By way of background, FIG. 1 depicts a typical injection mold 10 which is formed of two separable and matingly engageable mold halves 12 and 14. An interior mold cavity 16 is formed within the mold halves 12 and 14, when the mold halves 12 and 14 are joined together. The mold cavity 16 has the shape of a desired molded plastic article 18.

A sprue 20 is formed in one of the mold halves, such as mold halve 12, and communicates with an injection molding nozzle 22. The injection molding nozzle 22 has an internal bore 23 which receives a supply of molten plastic 24 from a suitable source, not shown. A gas nozzle 26 is disposed in communication with the bore 23 in nozzle 22 for injecting a pressurized gas into the flow of molten plastic or immediately after the flow of molten plastic into the mold cavity 16 has terminated, as described hereafter.

Figure 2:
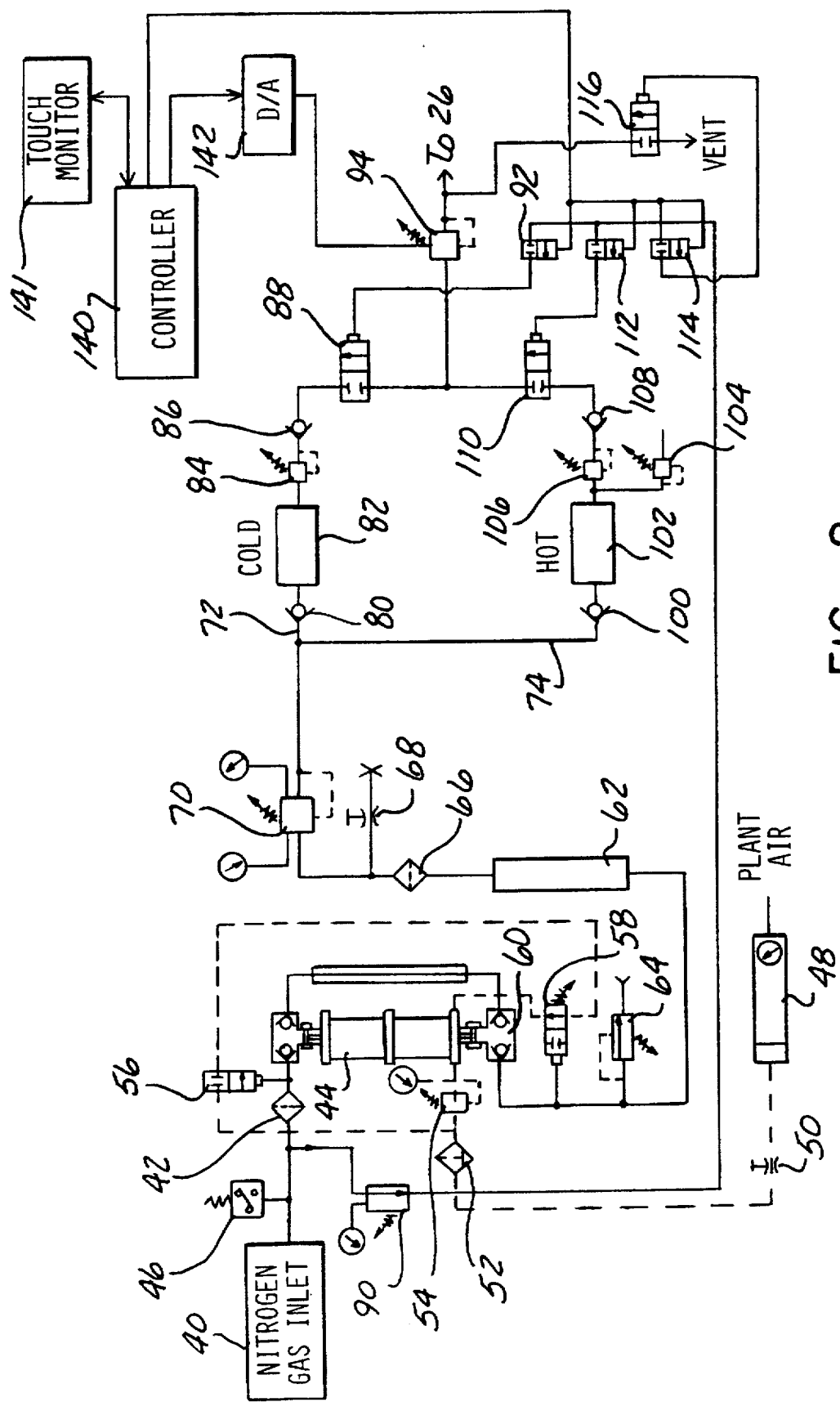
FIG. 2 is a schematic diagram of a gas assisted injection molding apparatus constructed in accordance with the teachings of the present invention.

Referring now to FIG. 2, there is depicted a schematic diagram of one embodiment of a gas assisted injection molding apparatus constructed in accordance with the teachings of the present invention. The present apparatus includes a means 40 for supplying pressurized gas. Although a tank of pressurized gas, such as nitrogen, can be employed to supply the desired quantity of pressurized gas during an injection molding process cycle, in a preferred embodiment, the gas supply means 40 preferably comprises a gas generating means, such as a nitrogen generation system manufactured by Balston, type 75-73. This system generates a supply of nitrogen gas from a plant air system by separating the air into two gas streams, one containing 95% to 99.5% nitrogen and the other containing oxygen, carbon dioxide and other trace gasses. The gas is supplied from the gas supply means or gas generating means 40 through a filter 42 to a gas pressurizing means 44, such as a gas booster sold by Haskel, Model No. 2881-AG1-30/75-C. A pressure switch 46 is connected to the gas supply inlet, ahead of the filter 42.

A pilot air fluid circuit receives plant air through a filter/regulator 48, a manual control valve 50 and a separate filter 52. The outlet of the filter 52 is connected to an air pressure regulator 54 whose outlet is connected to the gas pressuring means or gas booster 44. The outlet of the filter 52 is also connected to an air pilot switch or valve 56 which is controlled by the pressure of the gas from the gas supply means 40. The pilot switch 56 is connected to a second air pilot switch 58 whose outlet is in turn connected to the gas booster 44 for controlling the air pressure to the gas booster 44 which is used by the gas booster 44 to pressurize the gas output from the gas booster 44 to a predetermined high level ranging between 0 and 10,000 psi.

The outlet 60 of the gas pressurizing means or booster 44 is connected to a gas receiving means 62 which stores a large quantity of the pressurized gas. The gas receiving means 62 may be any type of gas storage vessel, such as a gas receiver sold by Haskel, model no. 28728-1. A gas pressure relief valve 64 is connected to the outlet 60 of the gas booster 44 to prevent over pressurization of the gas receiving 62.

The outlet of the gas receiver 62 is connected through a filter 66 to a manual vent valve 68 and, also, to a variable pressure regulator 70. The outlet of the pressure regulator 70 is separated into two branches, namely, a first branch 72 and a second branch 74.

According to a unique feature of the present apparatus, the apparatus is capable of providing gas to the mold 10 at two different temperatures hereafter referred to as a "cold" temperature and a "hot" temperature. The terms "cold" and "hot" are used in a relative sense with respect to each other and, also, with respect to the temperature of the molten plastic injected into the mold 10. For example, the "cold" temperature gas could range between approximately 65° to 80° F.; while the "hot" temperature gas could range between approximately 150° F. to 600° F. In addition, with an appropriate chiller, the "cold" temperature gas could range from 40° to –40° F.

The first gas delivery branch 72 includes a check valve 80 and a gas receiving means or receiver 82 which stores a predetermined quantity of the gas at the low or "cold" temperature. A pressure regulator valve 84, such as a Tescon model No. 28-1021-44, is connected to the outlet of the gas receiver 82 for regulating the outlet pressure of the low or "cold" temperature of the gas to a predetermined constant pressure. A check valve 86 is interposed between the pressure regulator valve 84 and a first controllable valve 88. The first valve 88 is controlled by pilot air pressure generated by a pressure regulator 90 connected to the gas supply means 40. The outlet of the pressure regulator 90 is connected to a first pilot control valve 92 which controls the switching of the first valve 88 and thereby the supply of the low or "cold" temperature gas through a final variable pressure regulator 94 to the gas nozzle 26 for injection to the mold 10.

The variable pressure regulator 94 is an electropneumatic regulator which is capable of setting a predetermined pressure within its operating range. For example, the regulator 94 may be a regulator valve manufactured by Tescom, model number 26-1021-44-045A/ER 2000. The regulator 94 receives an analog voltage signal from a digital to analog converter, as described hereafter, the magnitude of which signal is proportional to the desired outlet pressure from the regulator 94. The use of a single valve 94 provides a single pressure control point for both of the controllable valves 88 and 110 and, further, enables a controller to easily control the separate pressures of the hot and cold temperature gasses supplied to the nozzle 26 in the mold 10.

The second gas delivery branch 74 includes a check valve 100 and a means for heating the gas denoted by reference number 102. The gas heating means 102 preferably comprises a reactor, such as reactor model number HIP GC7 manufactured by the High Pressure Equipment Company. The gas heating means or reactor 102 heats the gas supplied from the gas receiver 62 to a high or "hot" temperature relative to the low or "cold" temperature of the gas in the gas receiver 82. A pressure relief valve 104 is connected to the outlet of the reactor 102. In addition, a pressure regulator 106 is also connected to the outlet of the reactor 102 to regulate the pressure of the "hot" temperature gas to a predetermined pressure. A check valve 108 is interposed between the pressure regulator 106 and a second controllable valve 110. The second valve 110 is controlled by pilot pressure from a pilot control valve 112 connected to the pressure regulator 90. In this manner, switching of the pilot control valve 112 to a flow position, by a control signal from a controller described hereafter, switches the second valve 110 to a position allowing the flow of gas at the high or "hot" temperature from the reactor 102 through the pressure regulator 94 to the gas nozzle 26 and then into the mold 10.

A vent circuit is also provided for venting each separate temperature gas from the mold 10 prior to the injection of the next different temperature gas. A pilot operated valve 116 is connected to the nozzle 26 and is controlled by a pilot valve 114 connected to the pressure regulator 90 and controlled by signals from a controller, as described hereafter.

Figure 3:
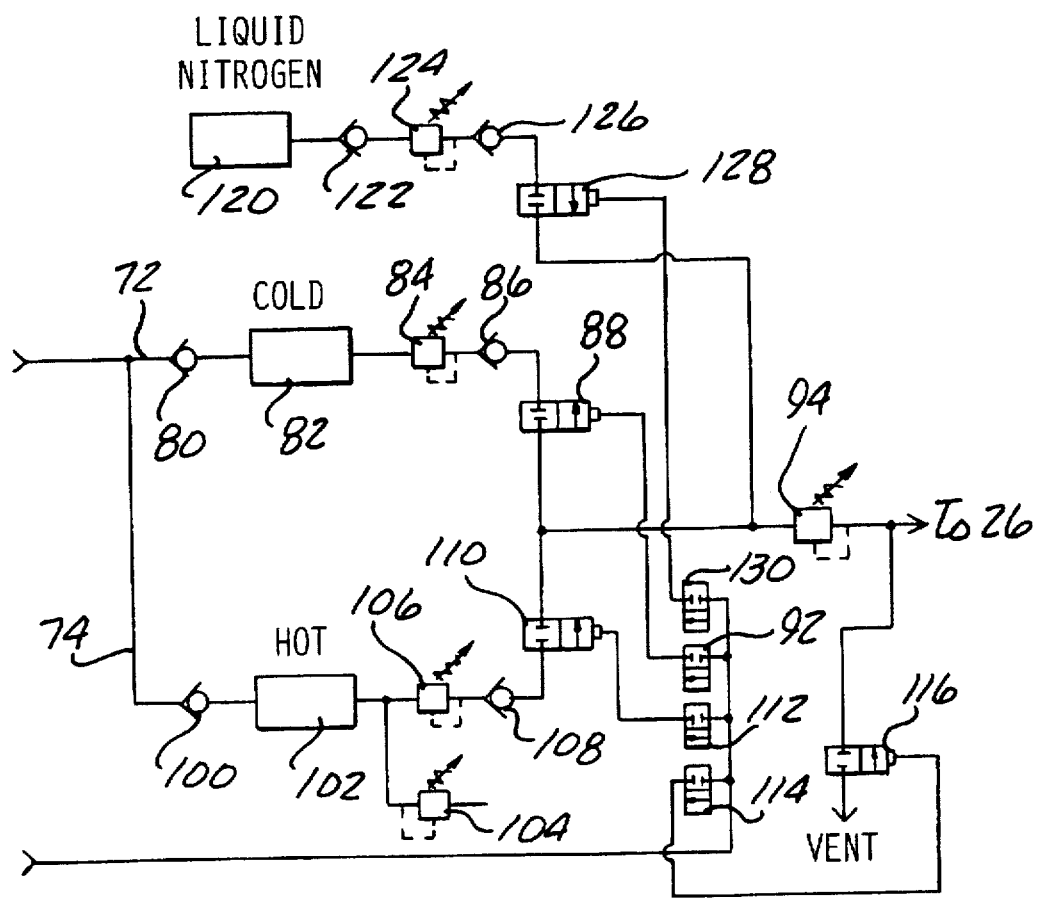
FIG. 3 is a partial schematic diagram showing a modification to the schematic of FIG. 2.

A modification to the fluid circuit shown in FIG. 2 is illustrated in FIG. 3. In this fluid circuit, an additional gas temperature circuit is provided for supplying gas at an extremely low or "cold" temperature to the injection mold 10. The super low or "cold" temperature may be in the range of −40° F. to −320° F.

Figure 4:
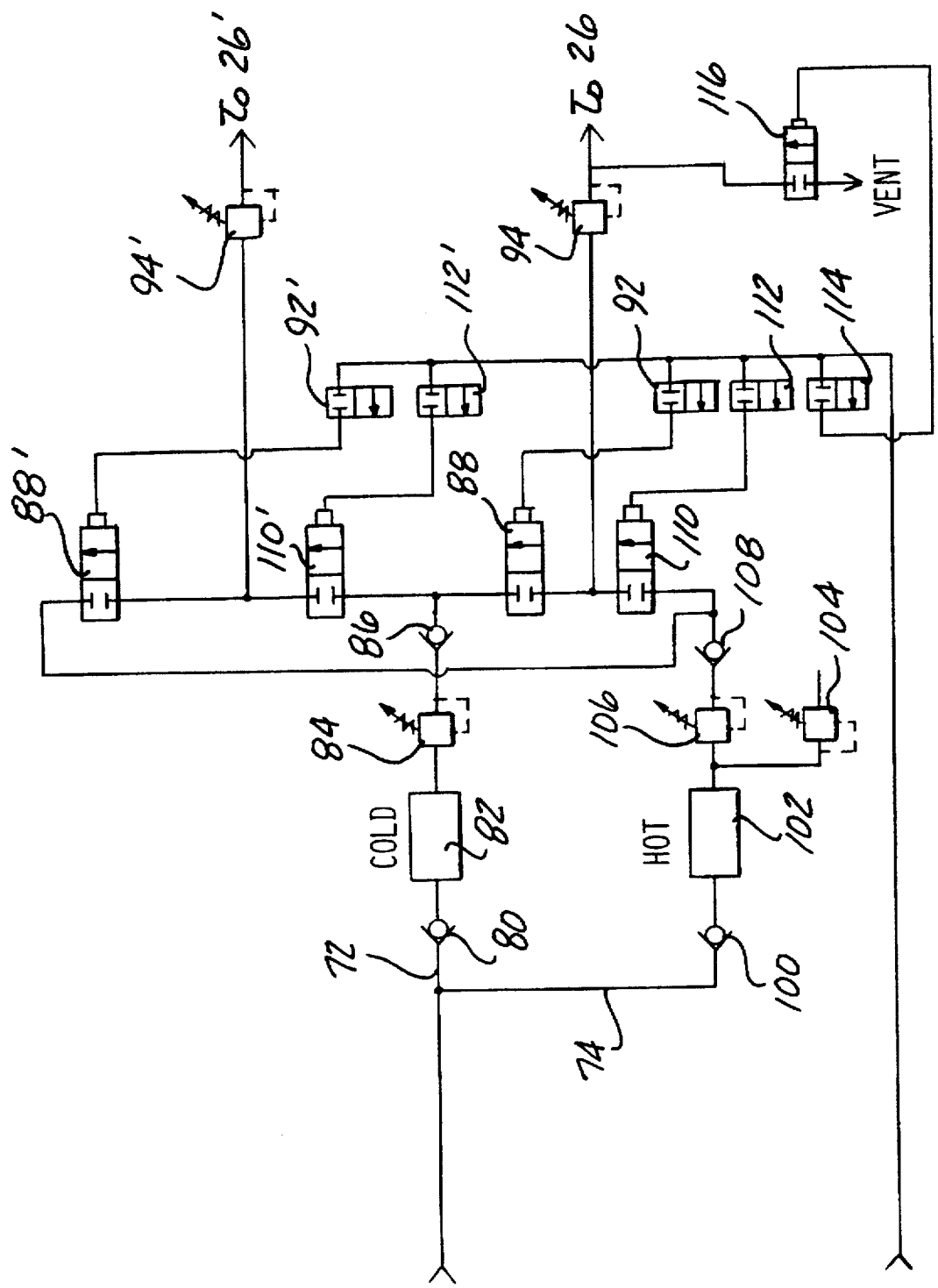
FIG. 4 is a partial schematic diagram showing another modification to the schematic of FIG. 2.

As shown in FIG. 4, a super low temperature source, such as a tank 120 of liquid nitrogen is employed. The liquid nitrogen can be withdrawn from the tank 120 as a gas by passing it through a vaporizing coil, not shown. The tank 120 can be pressurized at any desired pressure depending on the requirements of the injection molding application. Although, the pressure will vary the boiling point of the liquid nitrogen, i.e. the boiling point will vary between −320° F. and −260° F. at pressures ranging from 0-200 psia., the resulting nitrogen gas is still at a temperature significantly lower than the temperature of the molten plastic so as to quickly chill the molten plastic to a solid state.

The outlet of the tank 120 is connected through a check valve 122 to a pressure regulator 124. An additional check valve 126 is interposed between the outlet of the pressure regulator 124 and a third controllable valve 128. The outlet of the third controllable valve 128 is connected to the pressure regulator valve 94 for supplying super low temperature gas to the injection mold 10 in the same manner as the hot and cold temperature gas is supplied to the pressure regulator valve 94 through the valves 88 and 110, as described above.

A pilot control valve 130 is connected to pilot pressure from the pressure regulator 90. The pilot valve 130 is switchable by a control signal from a controller, as described hereafter, and controls the switching of the third controllable valve 128 between gas flow and gas blocking positions in a normal manner.

FIG. 4 depicts yet another modification to the fluid circuit shown in FIG. 2. The fluid circuit shown in FIG. 4 is designed to be used with an injection mold having two separate nozzles 22 which supply pressurized gas along with or after molten plastic has been injected through the nozzles into two separate sprues in the mold.

In the fluid circuit shown in FIG. 4, two parallel branches of controllable valves 88 and 110, and 88' and 110' are each commonly connected to separate controllable pressure regulators 94 and 94', respectively. Individual pilot control valves 92 and 112, as described above, are connected to and control the switch states of the first and second valves 88 and 110. An additional pair of pilot valves 92' and 112' are connected to the additional control valves 88' and 110' to control the switching of the valves 88' and 110' between gas flow and gas blocking states.

The valves 92, 112, 92' and 112' are separately energized by control signals from the controller to separately control the flow of hot and cold temperature gasses to the two nozzles 26 and 26' in the mold.

It should be noted that either of the control circuits to the nozzles 26 and 26' shown in FIG. 4 may also include the extremely low temperature fluid control circuit shown in FIG. 3 to additionally supply extremely low temperature gas to either or both of the nozzles 26 and 26'.

The valves 92 and 112 shown in FIGS. 2, 3 and 4 and the valves 130, 92' and 112' shown in FIGS. 3 and 4 are switchable under the control of a control means or controller 140. Although any stand alone computer, a PC, or dedicated electronic circuit may be employed for the control means 140, preferably the control means 140 is in the form of a PLC controller manufactured by Allen Bradley, model number 1747-L511. This controller includes standard power supply, input and output circuits, an analog output circuit, external communication circuits, not shown, and a touch screen or monitor 141.

As is conventional, the PLC controller 140 executes a control program stored in an internal memory to control the operation of the entire molding apparatus, including the opening and closure of the mold 10, the timed injection of molten plastic 24 into the mold 10, as well as the generation and delivery of pressurized gas at the "cold", "hot" and/or extremely low temperatures to the mold 10.

FIGS. 5A-5E depict an exemplary control program executed by the controller 140 to control the operation of the injection molding apparatus and, in particular, the sequence, time and pressure levels of hot, cold and extreme low or cold temperature gasses injected into the mold 10.

Various inputs are provided to the controller 140. These may be separate inputs in the form of pushbuttons or selector switches connected to the input signal conditioning circuits of the PLC controller 140 or, in a preferred embodiment, input signals provided through the touch screen 141 of the PLC controller 140. Such inputs include a cycle start signal which is an external signal generated by the injection molding machine when the injector is moving in a forward direction at the start of injection of molten plastic into the mold 10. Other inputs include an auto/manual signal, individual manual hot, cold and liquid nitrogen injection signals, a mold closed signal generated by a switch on the mold 10 which indicates that the mold halves 12 and 14 are in a fully closed position, a manual vent signal preferably provided through the touch screen 141 of the PLC controller 140, an output from the pressure switch 46 shown in FIG. 2 which is generated when the pressure in the gas supply means 40 falls below a predetermined level, such as 400 psi, and a mold machine cycle complete signal which is generated by the injection molding machine, typically when the mold halves 12 and 14 are in the open position at the completion of a full mold cycle.

The controller 140 also individually controls various outputs as will be described in the following description of the sequence of operation of the control program executed by the controller 140. In the control program shown in FIGS. 5A–5E, it will be assumed that the auto/manual input signal is on such that the symbolic contact shown in the ladder diagram is closed. Further, each timer shown in the ladder diagram depicted in FIGS. 5A–5E has contacts which operate in several different modes. A contact labeled "DN" closes when the time period programmed for a particular timer has expired or fully times out. Another contact type labeled "TT" closes immediately when the timer is activated and remains closed during timing of a particular timer. This contact opens when the timer times out at the end of the pre-programmed time period.

It will also be noted that the time periods preset into each of the timers shown in the ladder diagram in FIGS. 5A–5E are exemplary only as any desired time period may be provided by simple programming a desired time period through the touch screen connected to the controller 140.

Figure 5A:
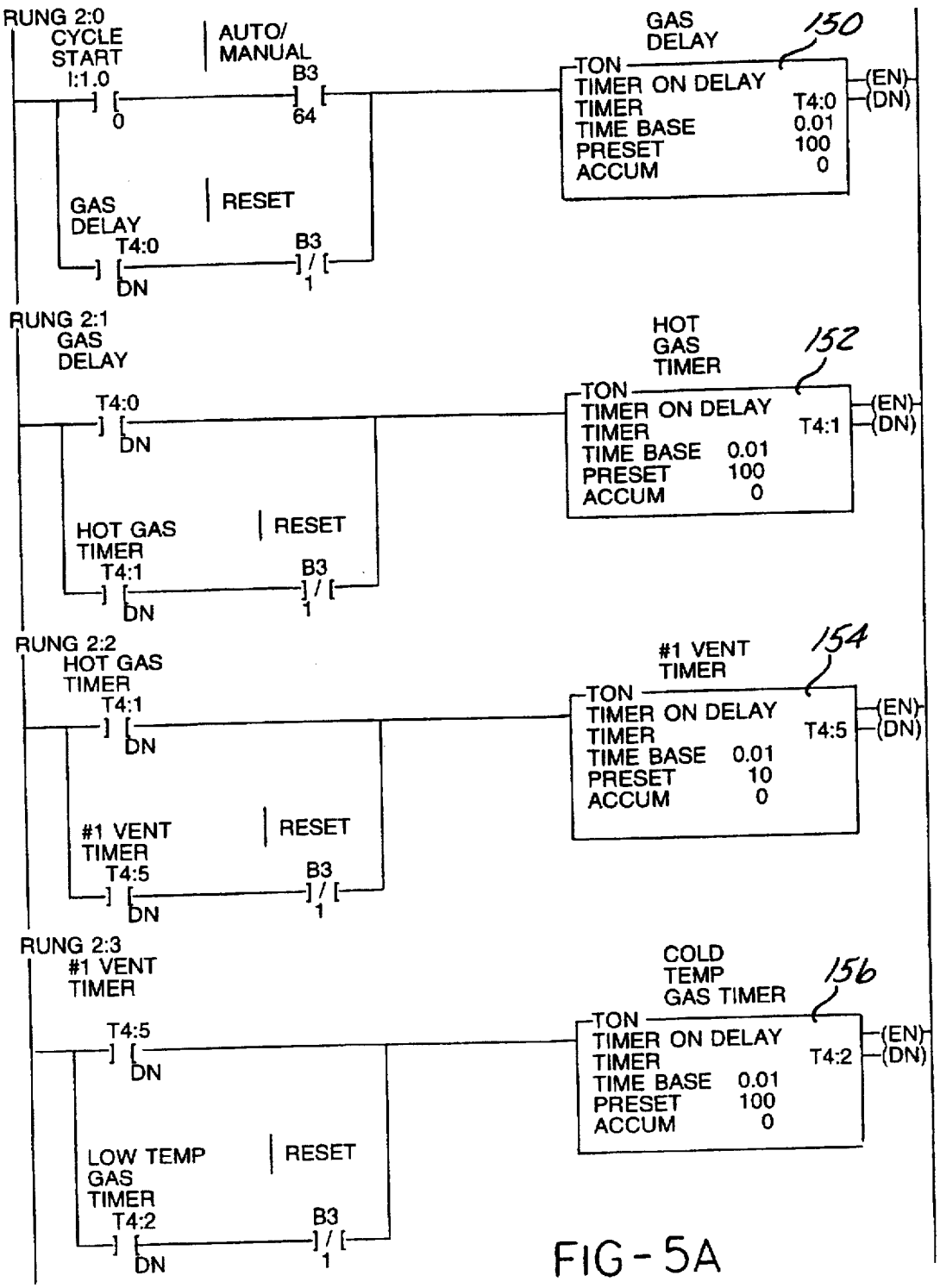
FIGS. 5A, 5B, 5C, 5D, and 5E are schematic diagrams of a control program executed by the controller.

As shown in the first rung 2:0 in the ladder diagram in FIG. 5A, when the CYCLE START signal is received, the gas delay timer 150 will be energized and starts timing. The time base, as shown in FIG. 5A for the gas delay timer 150 is 0.01 seconds and is preset for a count of 100 for a total time period of 1.0 seconds. At the completion of the preset time period, a contact T4:0 of the gas delay timer 150 will close thereby locking the gas delay timer 150 in an "on" state. Further, the closure of the gas delay timer contact T4:0 in rung 2:1, will energize the hot gas timer 152 which starts timing up to its preset time period.

The gas delay timer 150 provides a variably selectible, pre-programmed time period to delay the start of the injection of pressurized gas to the nozzle 26.

The hot gas timer 152 is also programmed for a preset count of 100 at a time base of 0.01 for a total time period of 1.0 seconds, for example only.

Immediately when the hot gas timer 152 starts timing, as shown in rung 2:9, contact T4:1 of the hot gas timer 152 will close. Assuming that the mold closed signal is present, the hot gas solenoid on the valve 112 will be energized to switch the second controllable valve 110 to the gas flow position to supply hot temperature gas from the reactor 102 to the pressure regulator 94 and from the pressure regulator 94 to the nozzle 26 in the mold 10. A separate manual hot gas inject signal is connected in parallel with the contact T4:1 to provide for hot gas injection by manual energization of the hot gas solenoid on the pilot valve 112.

At the completion of the preset time period programmed for the hot gas timer 152, the contact T4:1 in rung 2:9 will open thereby de-energizing the solenoid on the pilot valve 112. This causes the second valve 110 to switch to the gas blocking position thereby terminating the further injection of hot temperature gas through the nozzle 26 and into the mold 10.

Further, when the hot gas timer 152 times out, its DN contact T4:1, as shown in rung 2:4 in FIG. 5A, will close thereby energizing the number 1 vent timer 154. The number 1 vent timer is programmed for ten counts on a time base of 0.01 for a total time period of 0.1 seconds. As shown in rung 2:12 in FIG. 5D, energization of the number 1 vent timer 152 causes an immediate closure of contact T4:5 which energizes the gas vent solenoid on the valve 114 which switches the valve 116 to the open position to vent the hot temperature gas from the mold 10.

At the completion of the preset time period of the number 1 vent timer 152, contact T4:5 of the number 1 vent timer 154, as shown in rung 2:3 in FIG. 5A will close thereby energizing the cold temperature gas timer 156 to start its preprogrammed time period of 1.0 seconds. At the completion of the preprogrammed time period for the cold temperature gas timer 156, contact T4:2 will close thereby locking the cold temperature gas timer 156 in an energized state. Further, as shown in rung 2:10 in FIG. 5C, during the timing of the cold temperature gas timer 156, contact T4:2 will be closed thereby energizing the low temperature gas solenoid on the pilot valve 92 shown in FIG. 2. This causes the first controllable valve 88 to switch to a gas flow position thereby supplying cold temperature gas from the cold gas receiver 82 through the pressure regulator 94 to the nozzle 26 on the mold 10.

Figure 5B:
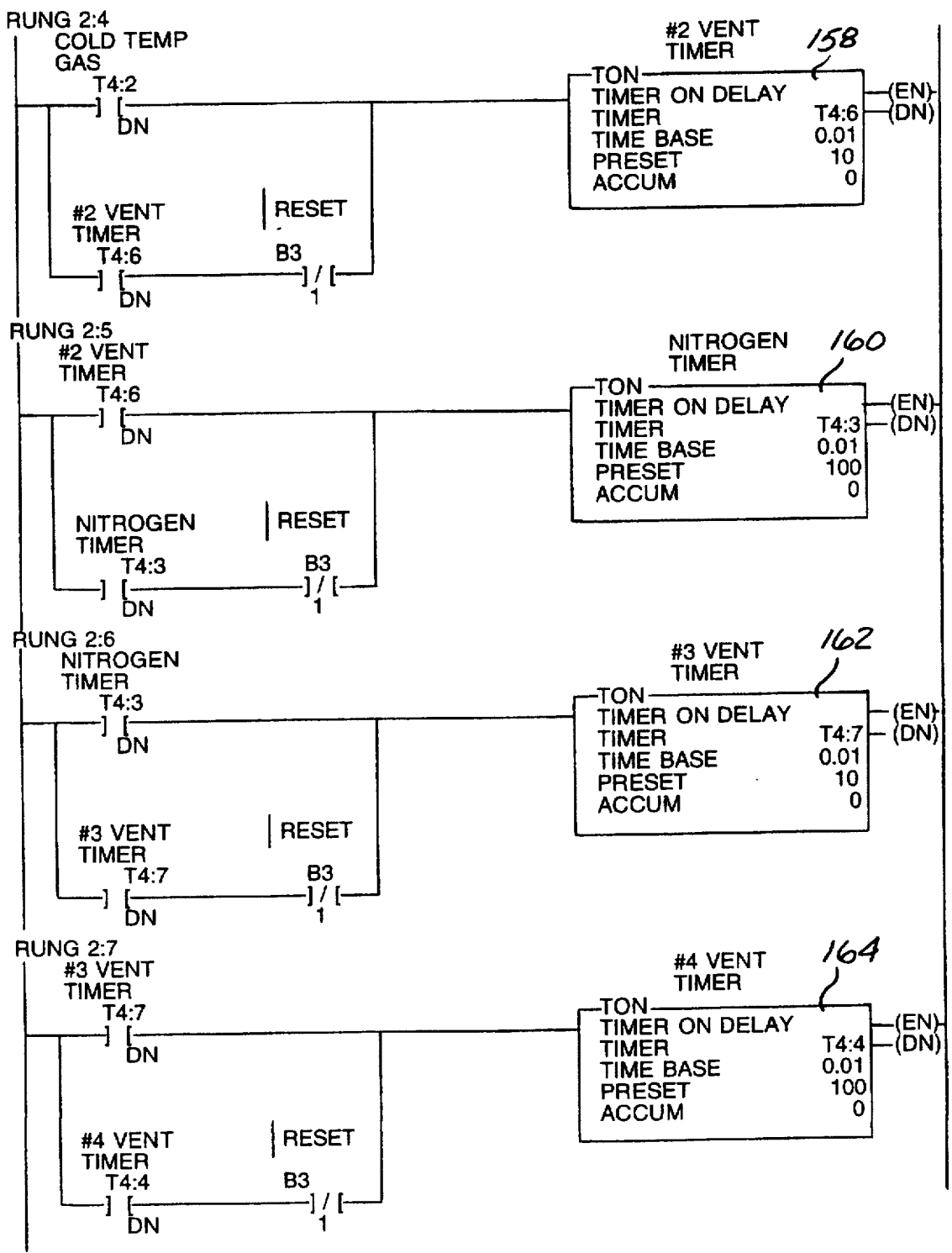

At the completion of the time period for the cold temperature gas timer 156, contact T4:2 in rung 2:4 will close thereby energizing number 2 vent timer 158 as shown in FIG. 5B. Contact T4:6 of the number 2 vent timer, in rung 2:12 shown in FIG. 5D, will close thereby again energizing the gas vent solenoid on the valve 114 to switch valve 116 to vent the cold temperature gas from the mold 10.

In rung 2:5 shown in FIG. 5B, completion of the time period of the number 2 vent timer 158 will cause contact T4:6 to close thereby energizing the nitrogen timer 160. Contact T4:3 of the nitrogen timer 160 will close at the completion of the preset time period of the nitrogen timer 160 thereby holding the timer 160 in an energized state. During the timing of the time period programmed into the nitrogen timer 160, contact T4:3 in rung 2:11 in FIG. 5C will close thereby energizing the solenoid of the pilot valve 130 shown in FIG. 3 which switches the state of the third controllable valve 128 to a gas flow position thereby supplying gaseous nitrogen from the liquid nitrogen tank 120 through the pressure regulator 94 to the nozzle 26 and then into the mold 10.

At the completion of the time period of the nitrogen timer 160, contact T4:3 as shown in rung 2:6 in FIG. 5B, will close thereby energizing the number 3 vent timer 162. Contact T4:7 in rung 2:12 shown in FIG. 5D will close at the completion of the number 3 vent timer 162 time period thereby again energizing the gas vent solenoid of the vent pilot valve 114 to switch valve 116 to the vent position to vent the extremely low temperature gas from the mold 10.

As shown in rung 2:7 in FIG. 5B, at the completion of the preprogrammed time period of the number 3 vent timer 162, contact T4:7 will close thereby energizing a number 4 vent timer 164. Contact T4:4, shown in rung 2:12 in FIG. 5D will close thereby again energizing the gas vent solenoid of the vent pilot valve 114 to switch valve 116 to the vent position to completely vent the mold of all pressurized gas.

In rung 2:13, the DN contacts from the gas delay timer 150, the hot gas timer 152, the cold temperature gas timer 156, the nitrogen timer 160 and a cycle complete signal from the injection molding machine will, when all present, energize a reset signal. Contacts from the symbolic relay associated with the reset signal will open thereby de-energizing each of the respective gas delay timer 150, hot gas timer 152, cold temperature gas timer 156 and nitrogen gas timer 166 as well as the associated number 1 vent timer 154, number 2 vent timer 158, number 3 vent timer 162 and the number 4 vent timer 164.

It will be noted that the above sequential energization of the hot gas valve 112, the cold gas valve 92 and the nitrogen gas valve 130 is by way of example only. Depending upon the plastic material being injection molded as well as the shape of the part and the number of individual nozzles 26 or 26' in the mold 10, only the cold temperature gas valve 92 may be energized, or, alternately, only the nitrogen valve 130 may be energized. Alternately, the nitrogen valve 130 may be energized before the cold temperature gas valve 92 is energized. This provides additional flexibility to the injection molding apparatus of the present invention so as to make it usable with all types of injection molding plastic and injection molded part shapes.

Figure 5C:
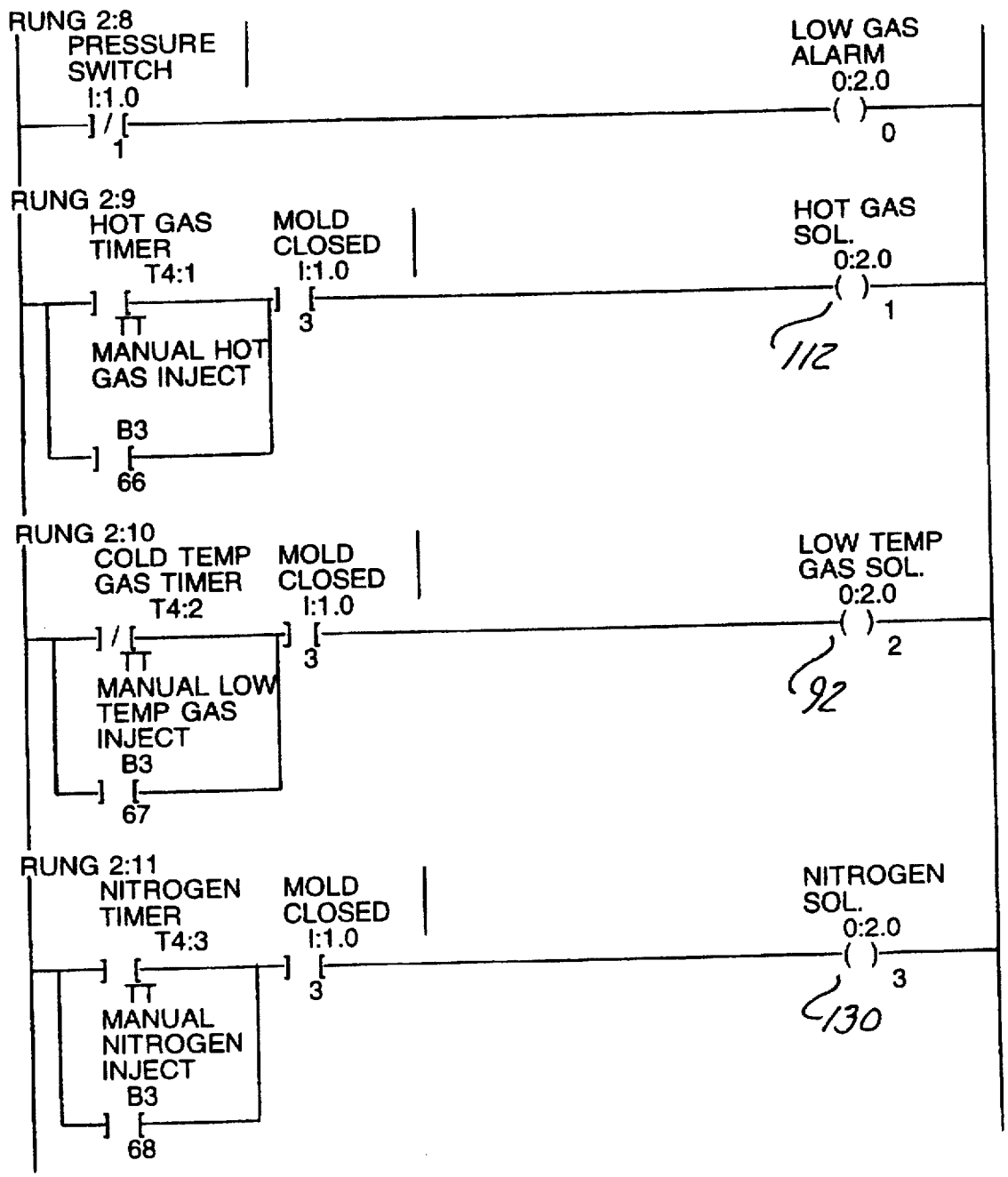
Figure 5D:
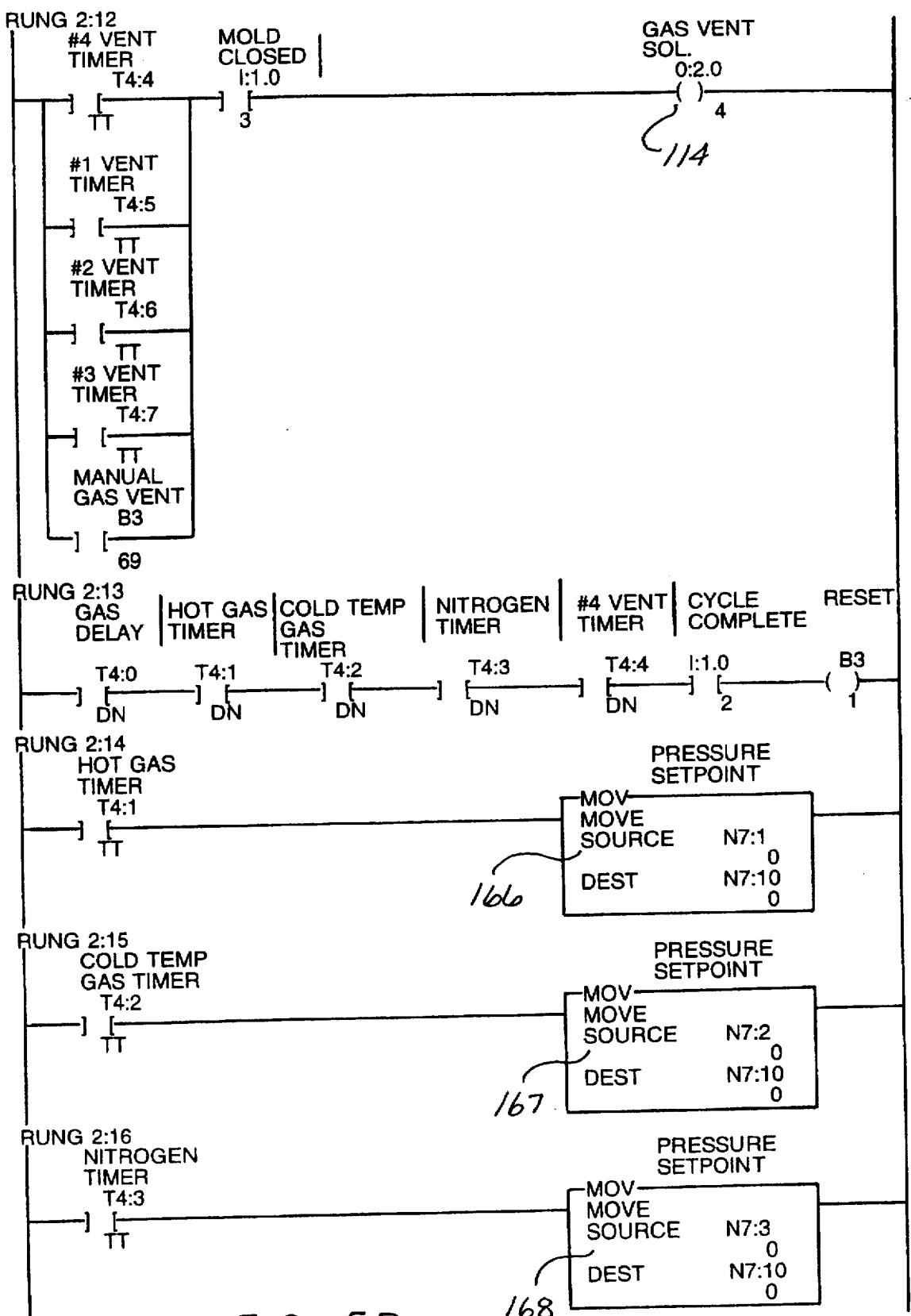

To complete the control circuit, rung 2:8 in FIG. 5C includes a low gas alarm signal which may be a visible light and/or audible alarm. The alarm signal is energized when an output signal is generated by the pressure switch 46 upon the detection of a predetermined low pressure level in the nitrogen gas supply 40.

Referring again to FIG. 5D, rungs 2:14, 2:15 and 2:16 show the setting of the pressure set points for the pressures of the hot gas, the cold temperature gas and the nitrogen gas. Upon closure of contact T4:1 of the hot gas timer 152, in rung 2:14, the controller 140 will move a pressure value prestored in memory via the touch screen 141 for each hot gas, cold gas and extremely low temperature gas to a working file in the controller 140, blocks 166, 167 and 168 in FIG. 5D. The controller 140 then converts the prestored pressure value to a digital value by multiplying the prestored pressure value by a preset multiplier. The multiplier is scaled up for accuracy of the generated pressure signals. This multiplication is shown in block 170 in FIG. 5E of the ladder diagram. Subsequently, the result is scaled down by a double divide instruction, block 172, to the range of a digital-to analog converter 142. The digital-to analog converter 142 generates a voltage proportional to the result. The output of the converter 142 is input to the regulator 94 which converts the voltage signal to the desired pressure. This scaled pressure set point sequence is repeated for each stage of hot gas, cold gas and extremely low temperature nitrogen gas injection into the mold 10.

Figure 5E:
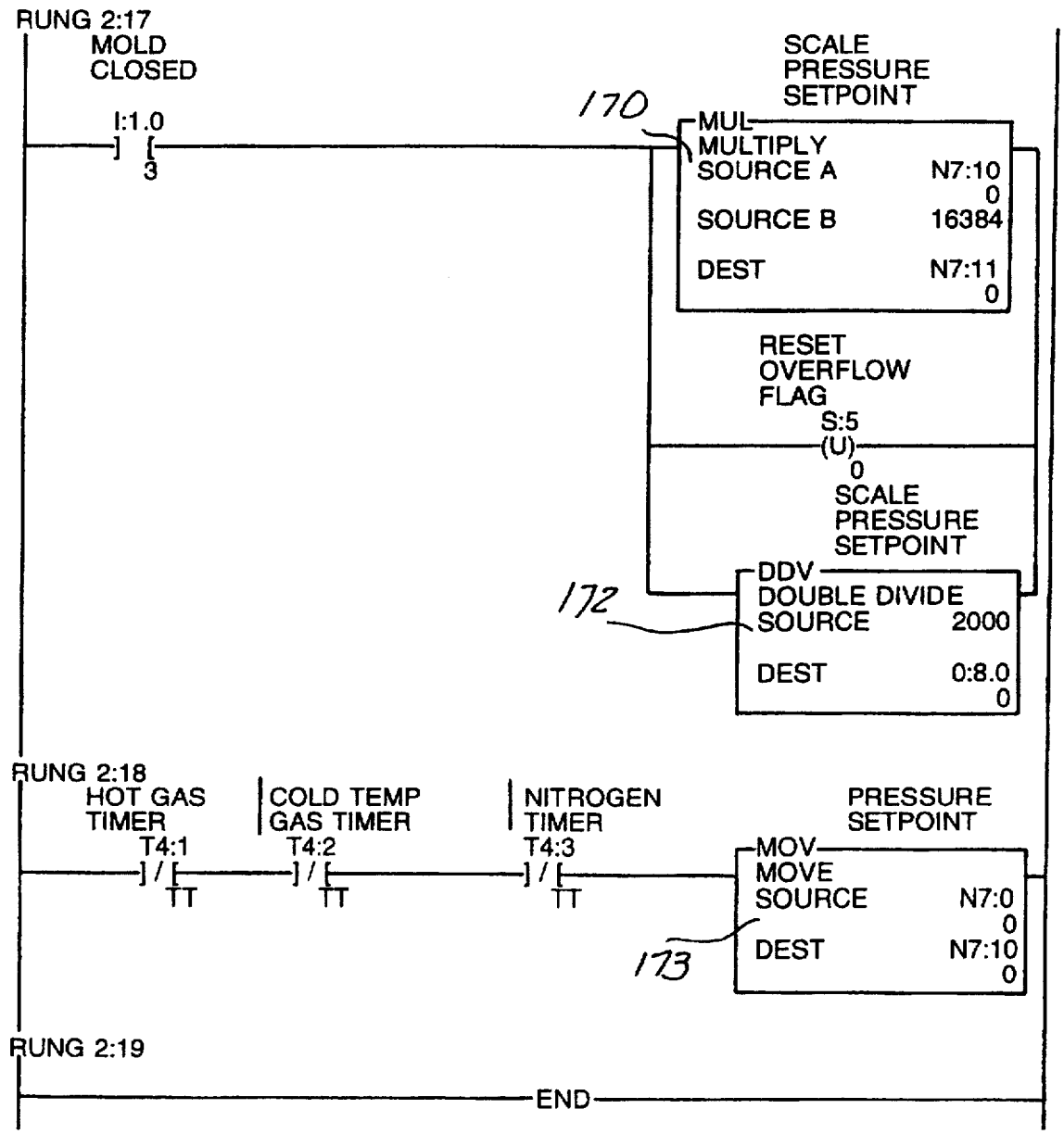

Finally, as shown in rung 2:18 in FIG. 5E, when each of the hot gas, cold gas and nitrogen gas timers have completely timed out, the respective normally closed contacts associated with each timer will reclose and cause the pressure set point value in rungs 2:14, 2:15 and 2:16 to be zeroed for the next mold cycle in block 173, FIG. 5E.

By the above-described sequence, the controller 140 selectively opens and closes the valves 112, 92 and 130 to selectively control the delivery of hot temperature, cold temperature and extremely low temperature gas through the nozzle 26 to the mold 10. The controller 140, by controlling the amount of time each valve 112, 92 and 130 is open, also controls the volume of hot temperature, cold temperature and extremely low temperature gas supplied to the mold 10. As described above, the controller 140, by controlling the pressure of the pressure regulator 94, also controls the pressure of hot temperature, cold temperature and extremely low temperature gas supplied through the nozzle 26 to the mold 10. In this manner, the controller 140 is capable of controlling any or all of the pressure, volume and delivery time of the hot temperature, cold temperature and extremely low temperature gasses to the mold 10.

It should be noted that the pressures of the hot gas, cold gas and extremely low gas supplied to the mold 10 may be completely different from each other. For example, the hot temperature gas may be supplied at 1000 psi, the low or cold temperature gas supplied at 2000 psi and the extremely low temperature gas supplied at 50 psi. Each pressurized gas cycle is completely vented, as described above, before the next different temperature pressurized gas is supplied to the mold 10.

Further, the above description describes an injection mold process in which one variably selectible pressure is supplied at a constant level for each of the hot temperature gas, cold temperature gas and extremely low temperature gas injection cycles. With additional timers and control logic, similar to that described above, each individual temperature gas injection cycle may be divided into a number of separate steps, each of different time periods and with different pressure set points. This enables the controller 140 to increase or decrease the pressure of any or all of the hot temperature gas, cold temperature gas or extremely low temperature gasses supplied to the mold 10. The gas pressures can be controlled in a linear, increasing or decreasing, ramp-like fashion or in a increasing or decreasing stepwise fashion. Further, the pressures can be increased or decreased in any sequence during any stage of each individual temperature gas supplied to the mold 10.

In summary, there has been disclosed a unique gas assisted injection molding apparatus which uniquely provides different temperature gasses to an injection mold. The supply of different temperature gasses to the mold in a predetermined, variably selectible sequence enables gas at substantially the same hot temperature of the molten plastic to be first injected into the mold to force the molten plastic outward against the walls of the mold cavity while preventing any initial solidification of such molten plastic prior to its compacting against the mold walls. The subsequent injection of cold temperature gas or extremely low temperature gas, either individually or in any sequence, can be utilized to hasten the solidification of the molten plastic into the final, desired product shape while providing the desired surface quality and constant wall thickness of the final product.

The apparatus of the present invention is programmable so as to enable the pressures of the individual different temperature gasses to be supplied in any sequence and at any increasing or decreasing, linear or stepwise fashion. This enables the apparatus to be employed with most types of injection in molding plastics.

What is claimed is:

1. A gas assisted injection molding apparatus for use with an injection mold, the apparatus comprising:

means for injecting molten plastic into an injection mold;

a source of injection gas;

first means, disposed in fluid communication with the source of injection gas, for delivering a first quantity of injection gas at a first temperature to the injection mold;

second means, disposed in fluid communication with the source of injection gas, for delivering a second quantity of gas at a second temperature to the injection mold;

means, communicating with the first delivering means, for making the first temperature of the first quantity of gas higher relative to the second temperature of the second quantity of injection gas, first valve means and second valve means, disposed in fluid communication with the first means for delivering the first quantity of injection gas and the second means for delivering the second quantity of injection gas, respectively, for causing flow of the first and second quantities of injection gas into the injection mold to force the molten plastic against the mold to form a hollow interior within the plastic as the molten plastic solidifies;

control means for controlling the first and second valve means to cause flow of the first and second quantities of injection gas into the injection mold in a preset sequence, the control means generating control signals representative of a separate, variably selected pressure for each of the first and second quantities of injection gas during each injection molding cycle; and a single variable pressure regulator connected in fluid flow communication with the first and second valve means and responsive to control signals from the control means for selectively setting a separate pressure for the delivery of each of the first and second quantities of injection gas to the injection mold.

2. The apparatus of claim 1 wherein:

the first temperature is substantially higher than the second temperature.

3. The apparatus of claim 1 wherein:

the first temperature is between substantially 150° F. to 600° F.; and the second temperature is between substantially 65° F. to 85° F.

4. The apparatus of claim 1 wherein:

the control means controls the first and second valve means and the variable pressure regulator to selectively vary at least one of the magnitude of the pressure and the delivery time of at least one of the first and second quantities of injection gas delivered to the injection mold during an injection molding cycle.

5. The apparatus of claim 1 wherein:

the control means controls the first and second valve means and the variable pressure regulator to selectively vary both the magnitude of the pressure and the delivery time of at least one of the first and second quantities of injection gas delivered to the injection mold during an injection molding cycle.

6. The apparatus of claim 1 further comprising:

means, disposed in fluid flow communication with the source of injection gas, for further pressurizing the injection gas.

7. The apparatus of claim 1 wherein the source of injection gas comprises:

means for generating the injection gas.

8. The apparatus of claim 7 wherein the generating means generates nitrogen gas.

9. The apparatus of claim 1 further comprising:

means, disposed in fluid communication with the source of injection gas, for delivering a third quantity of low temperature injection gas to the injection mold, the low temperature being substantially lower than the second temperature;

valve means, disposed in fluid communication with the means for delivering the third quantity of low temperature injection gas, for causing flow of the third quantity of low temperature injection gas into the injection mold; and the control means controlling the valve means to deliver the third quantity of low temperature injection gas to the injection mold in a selectible sequence with at least one of the first and second quantities of injection gas.

10. The apparatus of claim 9 wherein the means for delivering the third quantity of injection gas comprises:

a source of liquid nitrogen, the source of liquid nitrogen connected in fluid flow communication with the valve means.

11. The apparatus of claim 1 further comprising:

venting means, responsive to the control means, for venting each of the first and second quantities of injection gas from the injection mold prior to the delivery of the next one of the first and second quantities of injection gas to the injection mold.

12. The apparatus of claim 9 wherein the variable pressure regulator is also connected in fluid flow communication with the means for delivering the third quantity of injection gas, and is responsive to control signals from the control means, for selectively setting a pressure for the delivery of the third quantity of injection gas to the injection mold.

13. The apparatus of claim 1 wherein:

the first temperature is between substantially 150° F. to 600° F.; and the second temperature is between substantially 40° F. to −320° F.

14. The apparatus of claim 6 wherein the means for delivering the first quantity of injection gas at the first temperature comprises:

means, disposed in fluid flow communication with the source of injection gas, for heating the injection gas from the source of injection gas to the first temperature.

15. The apparatus of claim 1 wherein the variable pressure regulator, in response to pressure representative signals from the control means, sets a different pressure for each of the first and second quantities of injection gas supplied to the injection mold.

16. A method for injection molding plastic articles in an injection mold, the method comprising the steps of:

injecting a quantity of molten plastic into an injection mold;

providing a source of injection gas;

delivering a first quantity of injection gas from the source of injection gas at a first temperature;

delivering a second quantity of injection gas from the source of injection gas at a second temperature, the second temperature being lower relative to the temperature of the first quantity of injection gas;

controlling the flow of the first and second quantities of injection gas in a selectible sequence into the molten plastic in the injection mold to force the molten plastic against the injection mold to form a hollow interior within the plastic as the molten plastic solidifies to a solid state;

establishing a first variably selectible pressure for delivery of the first quantity of injection gas to the injection mold;

establishing a second variably selectible pressure for delivery of the second quantity of injection gas to the injection mold;

supplying control signals representing the first and second variably selectible pressures to a variable pressure regulator means, the variable pressure regulator means establishing the first and second pressures of the first and second quantities of injection gas to the injection mold, respectively.

17. The method of claim 16 wherein the steps of delivering the first and second quantities of injection gas further comprise the steps of:

heating a portion of the injection gas from the source of injection gas to form the first quantity of injection gas at the first temperature; and storing a portion of the injection gas from the source of injection gas as the second quantity of injection gas at the second temperature.

18. The method of claim 17 wherein:

the first quantity of injection gas is heated to a temperature of substantially 150° F. to 600° F.; and the second quantity of injection gas is stored at the second temperature between substantially 65° F. to 85° F.

19. The method of claim 16 wherein the steps of delivering the first and second quantities of injection gas comprise the steps of:

delivering a portion of the first quantity of injection gas to the injection mold for a predetermined selectible period of time;

then venting the portion of the first quantity of injection gas from the injection mold;

then delivering a portion of the second quantity of injection gas to the injection mold for a predetermined selectible time period; and then venting the portion of the second quantity of injection gas from the injection mold.

20. The method of claim 16 further comprising the steps of:

delivering a third quantity of injection gas from the source of injection gas at a third temperature, the third temperature being substantially lower than the second temperature; and controlling the flow of the third quantity of injection gas to the injection mold in a predetermined sequence with at least one of the first and second quantities of injection gas.

21. The method of claim 20 wherein the third temperature is between substantially 40° F. to −320° F.

22. The method of claim 20 wherein the step of controlling the flow of the first, second and third quantities of injection gas comprises the steps of:

delivering a portion of the first quantity of injection gas to the injection mold for a predetermined selectible period of time;

then venting the portion of the first quantity of injection gas from the injection mold;

delivering a portion of the second quantity of injection gas to the injection mold for a predetermined selectible time period;

then venting the portion of the second quantity of injection gas from the injection mold;

supplying a portion of the third quantity of injection gas to the injection mold for a predetermined time period; and then venting the portion of the third quantity of injection gas from the injection mold.

23. A gas assisted injection molding apparatus, the apparatus comprising:

means for injecting molten plastic into an injection mold;

a source of injection gas;

means, disposed in fluid communication with the source of injection gas, for delivering a first quantity of injection gas at a first temperature to the injection mold;

means, disposed in fluid communication with the source of injection gas, for delivering a second quantity of gas at a second temperature to the injection mold, the second temperature being lower relative to the first temperature of the first quantity of injection gas;

valve means, disposed in fluid communication with each of the means for delivering the first quantity of injection gas and the second quantity of injection gas, for causing flow of the first and second quantities of injection gas into the injection mold to force the molten plastic against the mold to form a hollow interior within the plastic as the molten plastic solidifies;

control means for controlling the valve means to cause flow of the first and second quantities of injection gas into the injection mold in a preset sequence; and variable pressure regulating means, connected in fluid flow communication with the valve means and responsive to control signals from the control means, for selectively setting a separate pressure for the delivery of each of the first and second quantities of injection gas to the injection mold, the variable pressure regulating means including a single variable pressure regulator disposed in fluid flow communication with the valve means and both of the means for delivering the first quantity of injection gas and the means for delivering the second quantity of injection gas, and electrically connected to the control means.

24. The apparatus of claim 23 wherein:

the control means controls the valve means and the variable pressure regulating means to selectively vary at least one of the magnitude of the pressure and the delivery time of at least one of the first and second quantities of injection gas delivered to the injection mold during an injection molding cycle.

25. The apparatus of claim 23 further comprising:

means, disposed in fluid communication with the source of injection gas, for delivering a third quantity of low temperature injection gas to the injection mold, the low temperature being substantially lower than the second temperature;

valve means, disposed in fluid communication with the means for delivering the third quantity of low temperature injection gas, for causing flow of the third quantity of low temperature injection gas into the injection mold; and the control means controlling the valve means to deliver the third quantity of low temperature injection gas to the injection mold in a selectable sequence with at least one of the first and second quantities of injection gas.

26. The apparatus of claim 25 wherein the means for delivering the third quantity of injection gas comprises:

a source of liquid nitrogen, the source of liquid nitrogen connected in fluid flow communication with the valve means.

27. The apparatus of claim 25 wherein the variable pressure regulating means is also connected in fluid flow communication with the means for delivering the third quantity of injection gas, and is responsive to control signals from the control means, for selectively setting a pressure for the delivery of the third quantity of injection gas to the injection mold.

28. The apparatus of claim 27 wherein:

the variable pressure regulating means, in response to pressure representative signals from the control means, sets a different pressure for at least two of the first, second and third quantities of injection gas supplied to the injection mold.

29. A method for injection molding plastic articles in an injection mold, the method comprising the steps of:

injecting a quantity of molten plastic into an injection mold;

providing a source of injection gas;

delivering a first quantity of injection gas from the source of injection gas at a first temperature;

delivering a second quantity of injection gas from the source of injection gas at a second temperature, the second temperature being lower relative to the temperature of the first quantity of injection gas;

controlling the flow of the first and second quantities of injection gas in a selectible sequence into the molten plastic in the injection mold to force the molten plastic against the injection mold to form a hollow interior within the plastic as the molten plastic solidifies to a solid state;

establishing a first variably selectible pressure for delivery of the first quantity of injection gas to the injection mold;

establishing a second variably selectible pressure for delivery of the second quantity of injection gas to the injection mold;

supplying control signals representing the first and second pressures to a variable pressure regulator means, the variable pressure regulator means establishing the first and second pressures of the first and second quantities of injection gas to the injection mold, respectively;

providing the variable pressure regulator means as a single variable pressure regulator; and connecting the single variable pressure regulator to control the pressure of both of the first and second quantities of injection gas.

* * * * *